Jan. 28, 1941.  A. C. CHAMBERLIN ET AL  2,229,638
INSPECTING APPARATUS
Filed Aug. 3, 1938   2 Sheets-Sheet 1
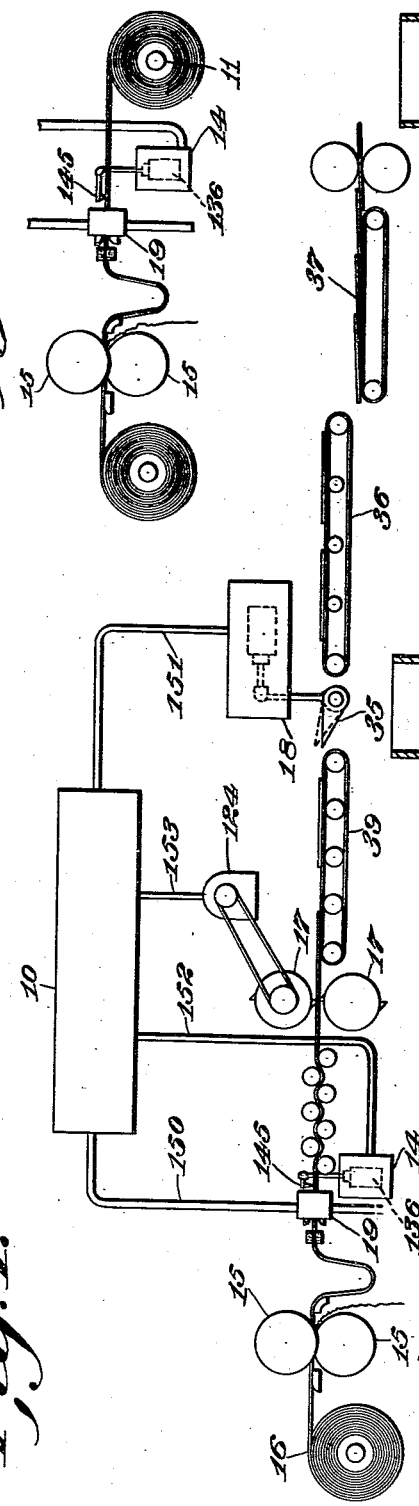
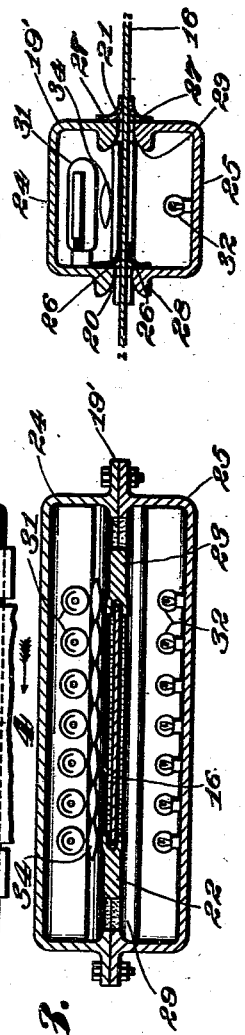
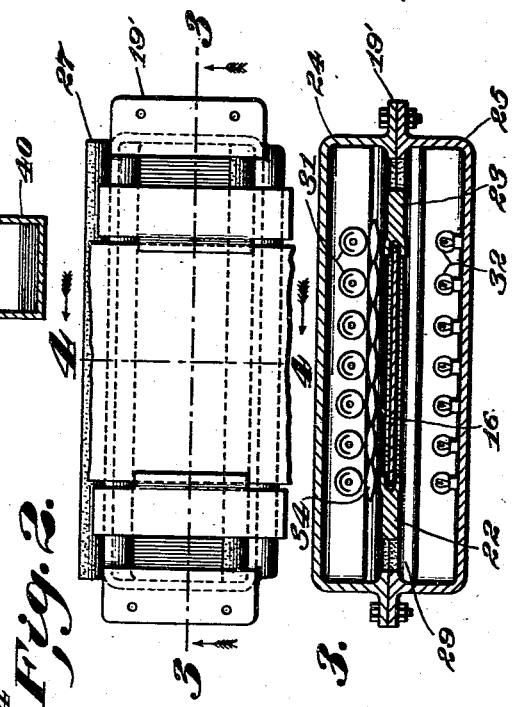
Inventors
A. C. Chamberlin
and H. W. Nieman
By R. S. C. Dougherty
Attorney

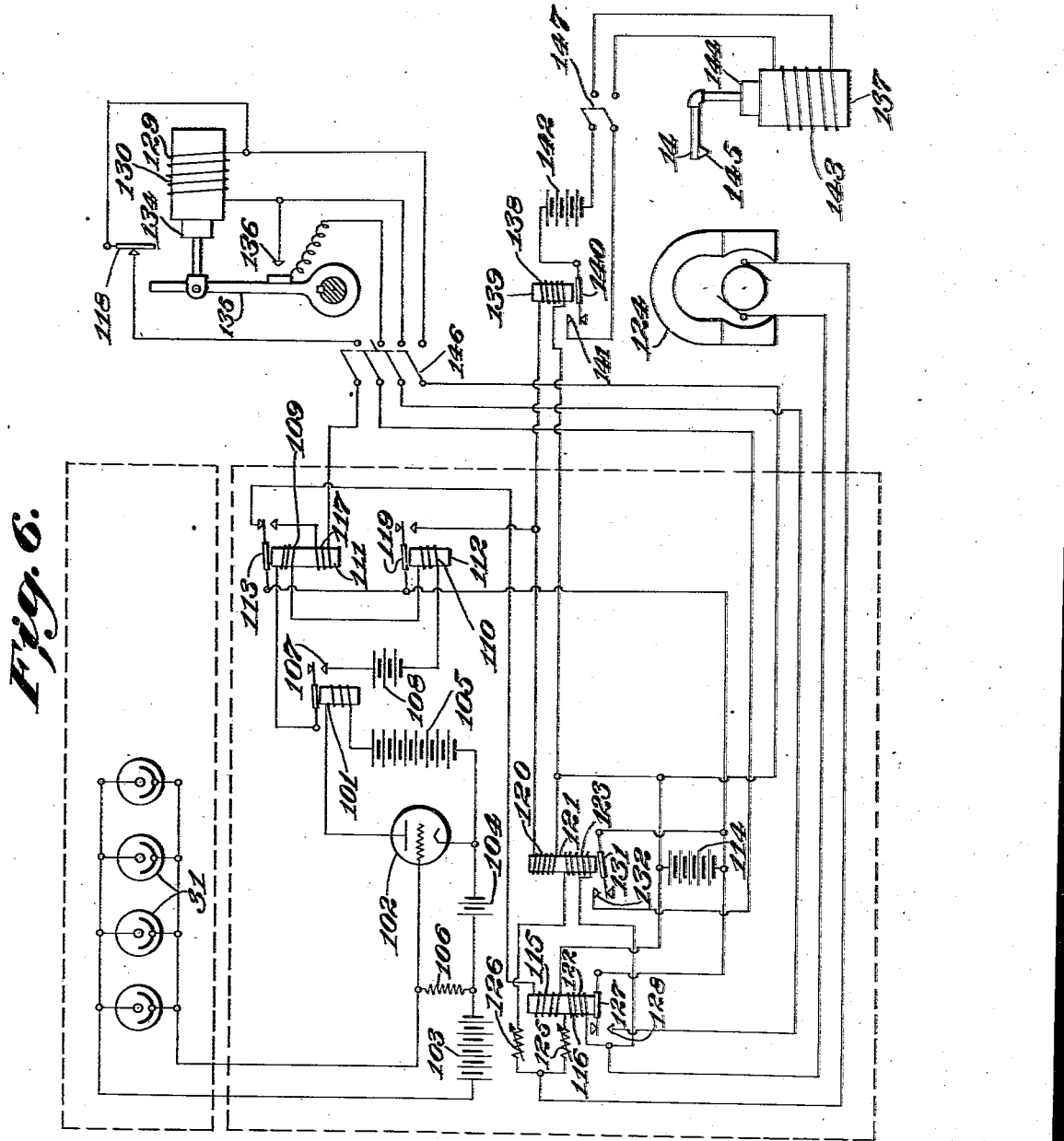

Patented Jan. 28, 1941

2,229,638

UNITED STATES PATENT OFFICE 2,229,638

INSPECTING APPARATUS

Alan C. Chamberlin and Henry W. Nieman, Bethlehem, Pa., assignors to Bethlehem Steel Company, a corporation of Pennsylvania Application August 3, 1938, Serial No. 222,853

16 Claims. (Cl. 164—68)

Our invention relates to the method of and devices for inspecting material for imperfections and particularly to the inspection of flat rolled products.

One object of our invention is to provide a novel method of inspecting material which will detect imperfections of small dimensions which are pervious to light in the material inspected.

Another object of our invention is to provide an inspection device which will be responsive to very small imperfections in the material inspected.

A further object of our invention is to provide an inspecting device which will automatically inspect the material and classify it according to the characteristics of the material.

A still further object of our invention is to provide a novel method of optically inspecting flat rolled products by disposing said product intermediate an optic and a source of luminous energy which is capable of effecting said optic.

A still further object of our invention is to provide a device which is highly sensitive so as to detect holes of very small dimensions in material, especially flat rolled products which are subsequently to be coated.

A still further object of our invention is to provide an inspecting device which is particularly suitable for inspecting flat rolled products for holes which are pervious to light, and automatically designating the material having such holes either by sorting said material from the remainder of the material or by indicating such defects, as by marking the material having holes, so that it can be easily identified.

The novel features of our invention will be more fully understood from the following description and claims taken with the drawings in which:

Figure 1 is a side view partly in elevation and partly diagrammatic illustrating one embodiment of our invention;

Fig. 2 is an enlarged top view of the inspecting device;

Fig. 3 is a section taken on line 3—3 of Fig. 2;

Fig. 4 is a section taken on line 4—4 of Fig. 2;

Fig. 5 is a side view in elevation of a modified structure embodying our invention; and Fig. 6 is a diagrammatic view of the electrical circuits and apparatus embodied in our invention.

Referring to Figs. 1 to 4, inclusive, of the drawings, wherein we have shown one form of carrying out our invention in connection with an apparatus which includes a shear travelling at a high rate of speed for shearing a strip into sheets or the like, 15 designates slitter rolls through which the material 16 is fed, 17 the flying shears for shearing the material into sheets and which also governs the speed of the strip therethrough, or the like. Located intermediate the slitter rolls 15 and the shears 17 is our inspecting device 19, which is especially adaptable for inspecting sheet metal products in their uncoated condition.

Referring to Fig. 5 we show our invention in connection with a strip of material which is not sheared after it passes through the slitter rolls 15, but which is recoiled onto the coiler 11, which operates to pull the material through our inspecting device 19.

The inspecting device 19, as clearly shown in Figs. 2 to 4, inclusive, comprises a housing 19' having openings 20 and 21 and guides 22 and 23, through which the strip 16 is guided, these openings and guides being disposed so that the strip 16 passing therethrough separates the housing 19' into upper and lower compartments 24 and 25, respectively. Flaps 26 and 27 are provided at the openings 20 and 21, respectively, to engage the surfaces of the strip 16 so as to prevent objectionable light from entering said compartments. The grooved guides 22 and 23 which are adjustably mounted in the guides 28 and 29, extend beyond the edges of the strip 16 and prevent light from entering by the sides of the strip 16 into the compartment 24. Suitable means are provided for retaining the guides 22 and 23 in their adjusted positions for variation in the width of the material to be passed through the housing 19'. Mounted in the compartment 24 is a plurality of light sensitive elements 31, which are preferably photo-electric cells, and which are disposed so as to receive rays from a source of energy capable of passing through imperfections in the material 16. Lenses 34 are positioned adjacent the elements 31. Mounted in the compartment 25 is a plurality of illuminating devices 32 for directing luminous energy onto the surface of the strip material 16 opposite to the light sensitive elements 31 so that any small imperfections in the material 16 pervious to rays from said energy will permit said rays to pass therethrough into the compartment 24, through the lenses 34, and onto the light sensitive elements 31.

The provision of the light sensitive elements 31 so as to receive rays which pass through imperfections in the material being inspected constitutes only one phase of the inspection procedure. After the material is inspected it is desirable to designate defective material either by means which will identify and/or reject defective portions of the material being inspected. Identification may be accomplished by means such as the solenoid operated marking device 14 which is clearly shown in Figs. 1 and 5 and which locally dents the material or in some other manner identifies the relative location of the defect. Rejection may be accomplished by separating the defective portions of the material from the remainder of the material, after the defective portions have been sheared, by means of the sorting device 18 which is clearly shown in Fig. 1.

The sorting device 18 comprises a deflector or diverting gate 35 which in its normal position, as shown in full lines in Fig. 1, permits sheets to pass from the conveyor 39 onto the conveyor 36 and thence to the conveyor 37 and into the receptacle 38 and when the deflector 35 is operated to the position shown in dotted lines to deflect the sheets from the conveyor 39 into the receptacle 40. The deflector 35 is operatively connected to suitable control devices hereinafter to be described which are under the control of the light sensitive elements 31.

To provide for the operation of the deflector 35 in timed relation to the inspecting device 19, regardless of the speed of the material, which, as shown in the drawing, is governed by the speed of the shear 17, a time delay device comprising the generator 124, which controls the speed of the operation of the deflector or diverting gate 35, is operatively connected to shear 17, so that a change in the speed of the shear 17 also changes the speed of the operation of the deflector 35 upon the light sensitive elements 31 having detected imperfections in the material 16.

The marking device 14 as shown in Figs. 1 and 5, comprises a solenoid controlled marking stylus 145 which is operatively connected to suitable control devices hereinafter to be described which are under the control of the light sensitive elements 31, so that when a defect is detected in the material passing through the inspecting device the solenoid 136 is immediately energized and causes the stylus 145 to mark the defective material.

The electrical circuits and controls for the inspecting device 19 and the sorting device 18 and marking device 14 are located in a suitable housing designated as 10 in Fig. 1. 150, 151, 152, respectively, designate conduits which contain the electrical wiring to the inspecting device 19, the sorting device 18 and the marking device 14, respectively, and 153 a conduit containing the electrical wiring to the generator 124. The wiring diagram of the electrical circuits and controls being plainly shown in Fig. 6.

Referring to Fig. 6 which shows the arrangement of the electrical parts, the bank of photocells 31 is connected to microrelay 101 through amplifier 102, batteries 103, 104 and 105, and resistor 106, as shown, following a standard arrangement for such apparatus so that actuating any of the photocells by light will cause microrelay 101 to close and remain closed as long as light falls on any of the photocells. Upon closing microrelay contact 107 an electric circuit is completed which permits current to pass from battery 108 to coils 109 and 110 of relays 111 and 112, causing the armatures 113 and 119 of relays 111 and 112, respectively, to move from their out positions, as shown in the drawings, to their in positions. The movement of armature 113 to its in position completes a circuit which permits current to flow from battery 114 through hold-in coil 117 to the switch 118, coil 117 being located on the core of relay 111 so that when the armature 113 is depressed it will remain depressed as long as switch 118 is in its closed position. When the armature 113 of relay 111 is in the out position, as shown in the drawings, current flows from battery 114 through actuating coil 115 of time delay relay 116 and holds the armature 127 in its in position as shown in the drawings and when the armature 113 moves to its in position the current to the coil 115 is interrupted and permits the armature 127 to open and to make contact at 128, the time required for such operation depending on the current being supplied to the bucking coil 122. The moving of armature 119 of relay 112 to its in position completes a circuit which permits current to flow from battery 114 through coil 120 of time delay relay 121 and causes the armature 131 to contact at 132 and when the armature 119 is in its out position, as shown in the drawings, such current will be interrupted to the coil 120.

Time delay relays 116 and 121 are constructed according to well known principles, each consists of an iron core on which is mounted an energizing coil and a bucking coil. When current passes through the energizing coil a flux is immediately built up in the iron core pulling the armature into its in position and holding it in such position for a prolonged period of time after the energizing circuit has been opened. This causes a prolonged delay period in the opening of the armature. To control the length of this delay a bucking coil is also placed on the core and a feeble current is applied thereto. The time delay in this case being inversely proportional to the strength of the bucking current applied.

Bucking coils 122 and 123 of time delay relays 116 and 121 are supplied with current from generator 124 through resistances 125 and 126, respectively. The current generated by the generator is proportional to its speed, the time delay of the relays will be inversely proportional to the speed of the generator, for given settings of resistors 125 and 126. By changing the values of the resistors the time delay for any given generator speed can be adjusted. When armature 127 of relay 116 falls open contact is made at 127 and current allowed to pass from battery 114 through coil 129 of solenoid 130. When armature 131 of time delay relay 121 is in its in position contact is made at 132. When coil 129 of solenoid 130 is energized by the current passing from battery 114, it draws plunger 134 inwardly, pulling with it arm 135 which is operatively connected to diverting gate 35 so that the raising of the arm 135 opens this gate. When the arm 135 is raised, contact is made at 136 so the current can pass from battery 114 through coil 129 if contact 132 is also closed even though contact 128 is open. Arm 135 in moving to its inward position also opens switch 118 so as to de-energize coil 117 and release armature 113, if this is at that time held in the in position by this coil.

The control for the marking device 14 comprises a relay 139, having a coil 138 which is in parallel with the coil 120 of relay 121 so that when said coil 120 is energized, as already set forth, coil 138 will also be energized and armature 140 of relay 139 will be drawn into its in position and close contact 141. This will complete the circuit through the battery 142 and permits current to flow from said battery through the coil 143 of solenoid 137 and operate plunger 144 with its marking stylus 145.

Switches 146 and 147 are placed in the circuits of the rejecting and identifying device, respectively, so that either one or both of the systems may be used at will.

In operation the material 16, which is being inspected, is fed from the rolls 15 through the opening 20 in the inspecting device 19 intermediate the grooved guides 22 and 23 and out through the opening 21 with the flaps 26 and 27 engaging the surfaces of the material 16, thereby shutting out the passage of light to the compartment 24. The illuminating devices 32 being in operation will direct beams of light against the under surface of the material 16, but due to the structure of the inspecting device 19 light rays from said illuminating devices 32 can not pass to the light sensitive elements 31 as long as portions of the material impervious to rays from said beam 32 and the elements 31, and the deflector 35 will remain in the position shown in full lines in the drawings and after the material has been sheared by the shears 17 the pieces are passed onto the conveyors 36 and 37 and into the receptacle 38. If, however, a portion of the material which is passing through the inspecting device contains one or more imperfections which are pervious to rays from the beam of light such rays will pass therethrough onto one or more of the light sensitive elements 31 actuating one or more of the light sensitive elements or photocells which in turn energizes relays 101, 111, and 112 and draws the armatures thereof into their in positions. When the armature 113 of relay 111 is drawn into its in position it will remain in this position after the defect has passed through the inspection device and relay 101 is opened because of the action of holding in coil 117, assuming switch 118 is closed. The drawing of the armature 113 into its in position will de-energize the coil 115 of the time delay relay 116 and after a definite period of time, therefore, the arm 127 of time delay relay 116 falls into its out position closing contact 128 and energizing the coil 129 of solenoid 130; whereupon plunger 134 of this solenoid is drawn inward and operates the arm 135, closing the contact 136 and opening the diverting gate 35. It also opens switch 118 and allows arm 113 of relay 111 to go into its out position and to energize coil 115 of time delay relay 116. This immediately draws into its in position arm 127, breaking the contact at 128. The current still continues to flow through solenoid 130, however, since contacts 136 and 132 are closed, contact 132 having been closed due to the energizing of the coil 120 pulling the arm 131 into contact with this contact 132 upon the completion of the circuit through this coil by the movement of the arm 119 to its in position for an instant when the light pervious defect passed through the inspection device. The arm 119 immediately returns to its out position as soon as the defect passes, but the armature 131 is held in contact with the contact 132 a definite period, which will permit the defective material to pass by the deflector or diverting gate 35 into the receptacle 40. After the definite period of time has elapsed the armature 131 will drop to its out position and interrupt the current through solenoid 130, which permits arm 135 to move outwardly and close the diverting gate 35 and the gate will remain in this position until another defect is discovered in the material.

Generator 124 is directly connected to the flying shear so that the current generated by the generator is proportional to the speed of travel of the material through the flying shear. Resistances 125 and 126 are adjusted so that the diverting gate 35 will not open until sufficient time has elapsed for the sound material preceding the defect to pass the diverting gate 35 and the diverting gate will not close until a slightly longer time interval is passed in order to hold the gate open until sufficient time has elapsed to allow the defective material to pass through the diverting gate.

If the marking device is connected, as indicated in the drawings, that is with the switch 147 closed, as the strip being inspected passes through the inspecting device and a defect is indicated, the solenoid 137 is immediately energized upon the energizing of the coil 138 of relay 139 and the closing of contact 141 which permits current to flow from battery 142 through coil 143 to the solenoid 137. Upon the energizing of solenoid 137 the plunger 144 is drawn inwardly and with it the marking stylus 145 which is so positioned that it strikes the material passing through the inspection device and thus makes a suitable mark on the material for each defect occurring therein.

When it is desired to use the marking device without the sorting device, the circuit to the sorting device is disconnected by opening the switch 146. The same is true when it is desired to use the inspecting device and the marking device as shown in Fig. 5 for automatically marking defects in a strip of material which is recoiled after passing through the inspecting device 19.

While we have shown our invention in a plurality of forms, it will be obvious to those skilled in the art that it is not so limited, but is susceptible of various other changes and modifications without departing from the spirit thereof, and we desire, therefore, that only such limitations shall be placed thereupon as are imposed by the prior art or as are specifically set forth in the appended claims.

Having thus described our invention what we claim as new and desire to secure by Letters Patent is:

1. A device for inspecting flat rolled products for surface imperfections, comprising a source of luminous energy, an optic to receive rays from said source passing through imperfections in imperfect products when said products are disposed intermediate said luminous energy and said optic and means operatively connected to said optic to separate said imperfect products from the remainder of the products.

2. A device for inspecting flat rolled products for surface imperfections, comprising a light sensitive element positioned in the path of a beam of light and shielded from other sources of light, means for disposing the product to be inspected across said path so that perfect products will shut off said beam from said light sensitive element and imperfect products, having defects therein pervious to rays from said beam, will admit said rays to said light sensitive element, and designating means for said products operatively connected to said light sensitive element and actuated upon said rays being admitted to said light sensitive element.

3. A device for inspecting flat rolled products for small holes therein preparatory to coating, said device comprising a light sensitive element and a beam of light and shielded from other sources of light, means for disposing said material intermediate said light sensitive device and said beam of light so that perfect material will shut off the beam of light to said light sensitive element and imperfect material having holes therein will permit rays from the beam to pass through said holes onto the light sensitive device.

4. A device for inspecting defects in a member, said device comprising a housing, a light sensitive element in said housing, means for directing a beam of light towards said light sensitive element, means for disposing the member to be inspected intermediate said first mentioned means and said light sensitive element whereby a perfect member will effectively shut off light to said light sensitive element and an imperfect member through which light rays from said beam will pass will admit said rays to said light sensitive element.

5. A device for inspecting a flat rolled product, comprising means for directing a beam of light onto one surface of said product, a light sensitive element shielded from extraneous light and located with respect to said means so that said element is shielded from said light beam by the product when it is impervious to said beam and so that said element will receive rays from said beam upon the passage thereof through a defect pervious to light in the product, and designating means actuatable upon said light sensitive element receiving a ray from said light beam.

6. A device for inspecting material for small defects therein, said device comprising a light sensitive element, means for directing a beam of light onto said material when said material is disposed intermediate said light sensitive device and said means, so that any defects therein pervious to light will permit rays from said beam to pass therethrough onto the light sensitive element, a sorting device for said material and control means for said sorting device under the control of said light sensitive element.

7. In combination with an apparatus including a shear for cutting a strip into sheets, a designating device for designating sheets so sheared having holes therein, a device in advance of said shear for inspecting the strip for holes therein, and means controllable by said inspecting device operatively connected to said designating device.

8. In combination with an apparatus including a shear for cutting a strip into sheets, a sorting device for separating sheets so sheared having holes therein, a device in advance of said shear for inspecting the strip for holes therein, and means controllable by said inspecting device operatively connected to said sorting device.

9. In combination with an apparatus including a shear for cutting a strip into sheets, a designating device comprising a marking device and a sorting device for said sheets so sheared having holes therein, a device for inspecting the strip or sheets for holes therein, and means controllable by said inspecting device for actuating said marking and sorting devices.

10. In combination with an apparatus including means for feeding a flat rolled metal product, an inspecting device located in the path of said product, said device comprising a light sensitive device shielded from extraneous light and a source of light for actuating said light sensitive device, said source of light and said light sensitive device being so arranged that a perfect product interposed therebetween will effectively shut off rays from said source of light to said light sensitive device but when imperfections occur in said product which are pervious to said light rays, said imperfections will permit said rays to pass therethrough onto said light sensitive device and designating means for said imperfections operatively connected to said light sensitive device and actuated thereby upon said device receiving rays from said source of light.

11. In combination with an apparatus including a shear for cutting a strip into sheets, a sorting device for said sheets, a device in advance of said sorting device for inspecting the strip for defects therein and means operatively connected to the inspecting device for controlling said sorting device, said inspecting device comprising means for directing a beam of light onto one surface of said strip and a light sensitive element opposite said beam of light and shielded from said light by said strip adapted to receive rays from said beam upon the passage thereof through a defect in said strip.

12. An apparatus for inspecting flat rolled metalic products or the like, a housing having grooved guides receptive of the side edges of said products, means for feeding said products through said guides and a device actuated by light rays positioned in said housing so that products passing through said guides when free from defects will effectively prevent light rays from reaching said device and when a product having defects pervious to light rays passes therethrough light rays will be directed onto said device.

13. A device for inspecting defects in a member, said device comprising a housing impervious to light, means for receiving the member to be inspected, a light sensitive element in said housing, an illuminating device adapted to direct rays of light onto the surface of the member being inspected opposite the light sensitive device and onto the light sensitive device upon a defect pervious to said rays occurring in said material, said light sensitive element being otherwise shielded from all sources of light.

14. An apparatus comprising an inspecting device, said device comprising a housing having an entrance thereto for the material to be inspected, grooved guides within said housing for engaging the side edges of said material, a source of luminous energy disposed on one side of said guides and a light sensitive element disposed on the other side of said guides.

15. An apparatus comprising an inspecting device for flat rolled products and a sorting device for said products, a control for said sorting device and means operatively connected to said inspecting device to render said control effective, said means comprising a relay for operatively connecting said inspecting device to said control and a time delay element for said control.

16. An apparatus comprising an inspecting device for inspecting flat rolled products, a shear for cutting said products into smaller units, and a sorting device for said units, a control for said sorting device, and means under the control of the inspecting device for rendering the control effective, said means comprising means operatively connecting said inspecting device to said control and a time delay element for said means operatively connected to said shear.

ALAN C. CHAMBERLIN.
HENRY W. NIEMAN.